United States Patent Office 3,723,068
Patented Mar. 27, 1973

3,723,068
APPARATUS FOR THE PREPARATION OF SULFUR DIOXIDE
Robert A. McIlroy, Alliance, Warnie L. Sage, Louisville, and Henry P. Markant, Alliance, Ohio, assignors to The Babcock & Wilcox Company, New York, N.Y.
Continuation-in-part of application Ser. No. 729,103, May 14, 1968. This application Dec. 14, 1970, Ser. No. 97,529
Int. Cl. C01b 17/54
U.S. Cl. 23—262   1 Claim

ABSTRACT OF THE DISCLOSURE

A system for preparing sulfur dioxide gas whereby sulfur is burned within a cyclone furnace supplied with a closely controlled amount of excess air to minimize sulfur trioxide formation. The furnace is constructed to assure substantially complete conversion of the sulfur to sulfur dioxide, with no liquid sulfur droplets entrained in the product gases. The combustion product gases from the furnace can be subsequently passed directly to and through a water spray tower for cooling and to remove any sulfur trioxide present.

---

This is a continuation-in-part of our application Ser. No. 729,103, filed May 14, 1968 and now abandoned.

This invention relates generally to the art of preparing sulfur dioxide gas, and more particularly to a system for preparing sulfur dioxide gas in a form suitable for use in making and fortifying cooking liquor used in the magnesium bisulfite process of pulp manufacture.

It is generally known that sulfur dioxide gas can be generated by burning raw sulfur in air, and the product resulting will be a mixture of sulfur dioxide and the incombustible components of the combustion air, and to a lesser extent sulfur trioxide.

Heretofore, several types of sulfur burning equipment have been used to supply the needs of industry for sulfur dioxide gas. However, such prior art equipment has the disadvantage of requiring relatively large combustion chambers in order to secure complete oxidation of the sulfur. The equipment size per daily ton of sulfur burned is especially high in the case of pool type furnaces wherein combustion takes place at the surface of a pool of molten sulfur.

The invention is directed to providing a sulfur dioxide generating and processing apparatus wherein sulfur is supplied continuously in fluidized form, either as a powder transported in a stream of primary air or as a spray of liquid sulfur droplets, to a cyclone furnace for burning therein, and the combustion gases are passed directly into a spray tower. The spray tower cools the combustion gases and assures that any sulfur trioxide therein will be removed from the sulfur dioxide before delivery into associated process equipment.

The various features of novelty which characterize our invention are pointed out with particularly in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

DESCRIPTION OF THE PREFERRED EMBODIMENTS OF THE INVENTION

Figure 1:
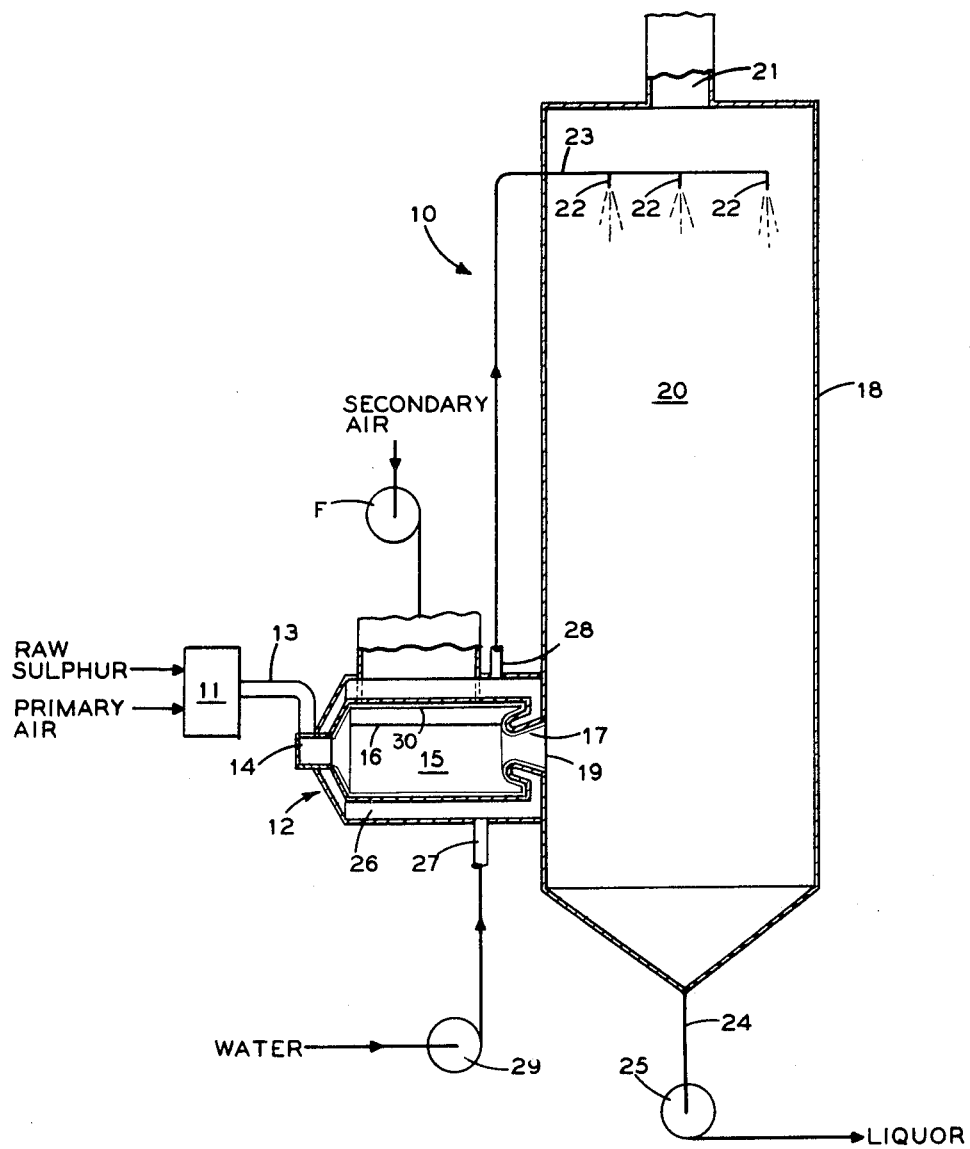
FIG. 1 is a schematic illustration of an apparatus according to a preferred embodiment of the invention which is adapted to burn sulfur.

In the sulfur dioxide gas generating apparatus 10 shown in FIG. 1, raw sulfur is introduced into a mill 11 and is crushed to a consistency such that the powdered sulfur can be carried in fluidized form by the primary air sweeping through the mill 11, via pipe 13, to the burner 14 of a cyclone furnace 12. From burner 14, the powdered sulfur-primary air mixture is introduced into the combustion chamber 15 of furnace 12.

While the sulfur is delivered to the furnace 12 in dry form in the embodiment of FIG. 1, it will be understood the furnace may be alternately supplied with liquid sulfur through the burner 14. In the dry fluidized form the sulfur in a carrier air stream delivered through the pipe 13 through the burner 14 enters the burner tangentially with respect to the wall of the burner. Thus, the air and powdered sulfur entering the combustion chamber 15 is swirling and expands outwardly along the frusto-conical surface of the furnace end wall. The dry sulfur particles are entrained by secondary air introduced tangentially at 16 for high velocity cyclonic movement through the furnace toward the outlet 17. It is understood in the art that the temperature of the sulfur during preparation and for delivery to the burner should be relatively low, such as 175° F., to avoid agglomeration of the sulfur.

When liquid sulfur is used the raw sulfur is placed in the molten form by the application of heat from, for example, steam coils. The molten sulfur may then be introduced into the burner 14 in an axial direction with a mechanical spray nozzle projecting the molten sulfur in coarse atomized form adjacent the inner surface of a frusto-conical portion of the combustion chamber 15. It has been found desirable to introduce at least a small amount of combustion air into the burner 14 in a tangential direction so as to initiate a swirl in the molten globules of sulfur progressing toward the interior surface of the combustion chamber 15. Originally the molten sulfur delivered to the furnace will be at a temperature of the order of 275° F., for ease of pumping.

In the embodiment of the combustion chamber 15 shown in FIG. 1, the furnace is of circular cross-section and is provided with a re-entrant throat at the outlet 17 of the furnace. In accordance with this invention, secondary air is introduced tangentially through an inlet 16 which extends substantially the full length of the cylindrical portion of the furnace 15. The depth of the opening 16, radially of the furnace 15 is calculated to give sufficient velocity of the entering air to cause the incoming sulfur, whether wet or dry, to impact on the wall of the cyclone furnace 15, and to form a molten film of sulfur on at least the fuel entering end portion of the cyclone walls.

In operation, the combustion chamber 15 will be heated to a value of about 800 to 1,000° F. by the use of natural gas or fuel oil or the like before the sulfur is introduced into the furnace. With a warm furnace, combustion of the sulfur is initiated and maintained within a relatively wide range of sulfur quantity introduction. The sulfur particles are rapidly melted and vaporized upon entering the furnace with some of the sulfur being in suspension and the remaining larger size particles, either initially dry or liquid, depositing on and forming a molten film on the inner wall of the furnace, at least at the entering end portion of the furnace. In the furnace illustrated with a L/D (length to diameter) ratio of 1 to 1, or 2 to 1, it has been found that the gaseous products of combustion contain sulfur dioxide, a small percentage of sulfur trioxide and the residual incombustible gaseous components of the air supplied to the combustion chamber 15.

With either wet or dry sulfur as the fuel, the amount of total air supplied to the furnace 15 (through both pipe 13 and tangential outlet 16) is regulated by any suitable means (not shown) so that the amount of air is closely correlated with the amount of sulfur supplied to assure complete combustion. The excess air is preferably kept at about 15% to hold down the production of sulfur trioxide produced to a value below 3%. In many instances, it is possible to reduce the excess air to a total amount equivalent to about 5% and thereby reduce the sulfur trioxide produced to under 1% while still converting all of the sulfur to the oxide form.

The sulfur trioxide is detrimental, for example, to the overall chemistry of a magnesium bisulfite pulp making process since it forms $MgSO_4$ which is an inert and places a dead load on the system and therefore it is preferably removed from the gas mixture issuing from the cyclone furnace 12. This is done in a spray tower 18 that has an inlet 19 communicating with the outlet 17 of furnace 12 to receive therefrom the gaseous combustion products resulting from the burning of the sulfur. Spray tower 18 has a vertically extending direct contact gas chamber 20 which facilitates the flow of the sulfurous gases from inlet 19 to an outlet 21 thereabove. At the upper end of the gas chamber 20 is a group of spray nozzles 22 connected to a common feed pipe manifold 23 which receives liquid (preferably water) from a pressurized source.

The nozzles 22 spray the liquid in a downward direction into chamber 20 and into direct contact with the upwardly flowing combustion gases, i.e. countercurrent to the gas flow. The spent liquid is collected at the bottom of chamber 20 and is removed therefrom through a drain line 24 with the aid of a pump 25.

The sulfur trioxide in the gases is removed by absorption in the liquid droplets with simultaneous cooling of the gas mixture. The liquid feed rate, dimensions of chamber 20, and the liquid-gas contact path length are selected in relation to the sulfur burning rate such that the gas mixture arriving at the delivery outlet 21 is substantially free of sulfur trioxide and has been cooled to a temperature of, for example, 100° F. to 150° F., which is suitable for the typical sulfur dioxide intake requirements of the magnesium bisulfite pulping process.

Actually, this liquid will be a warm to hot dilute sulfuric acid solution, by reason of the sulfur trioxide absorption, and will contain a small amount of entrained sulfur dioxide and/or sulfur trioxide which may be extracted before the liquid is discarded or dumped to waste.

As shown in FIG. 1, an annular jacket 26 externally surrounds the combustion chamber 15 of cyclone furnace 12, this jacket 26 having an inlet 27 and an outlet 28 to accommodate the circulation of a coolant fluid, such as water, in contact with the exterior surface of chamber 15. Where the coolant fluid supplied to the cooling jacket 26 is water, this same water, or a portion of it can be sprayed into tower 18, and for such purpose, pipe manifold 23 can be connected to the water jacket outlet 28 to receive the coolant water discharge therefrom. The inlet 27 of jacket 26 is connected to a water supply pump 29.

The inside surface of combustion chamber 15 is provided with a refractory lining 30 selected for the particular service conditions and for the purpose of maintaining an internal boundary temperature which is above the boiling point of sulfur, 833° F., so as to assure complete combustion of substantially all sulfur entering chamber 15.

To further assure complete sulfur combustion within a minimum volume burning zone, the combustion chamber 15 is provided at its gas exit end with a reentrant throat section that defines the outlet 17. By using a reentrant throat section, the effective residence time of the sulfur burned in chamber 15 is increased without any volume increase of the furnace.

Figure 2:
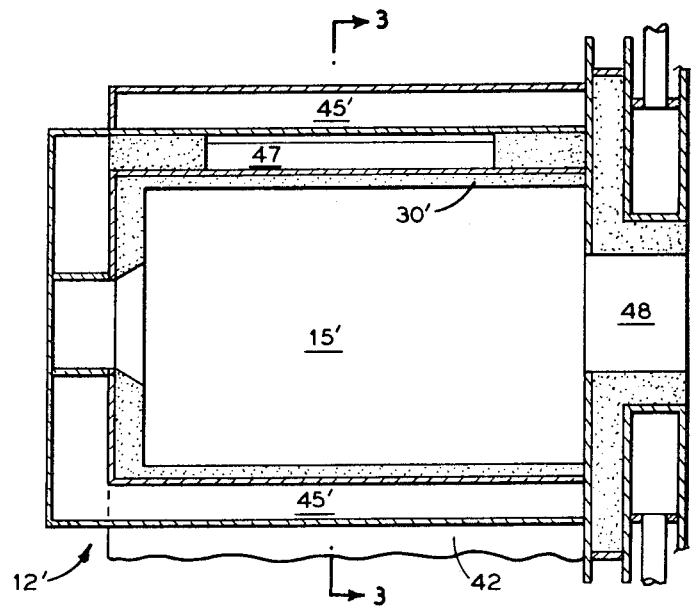
FIG. 2 is a longitudinal cross-sectional view of a modified form of cyclone furnace of the general type shown in the apparatus of FIG. 1.
Figure 3:
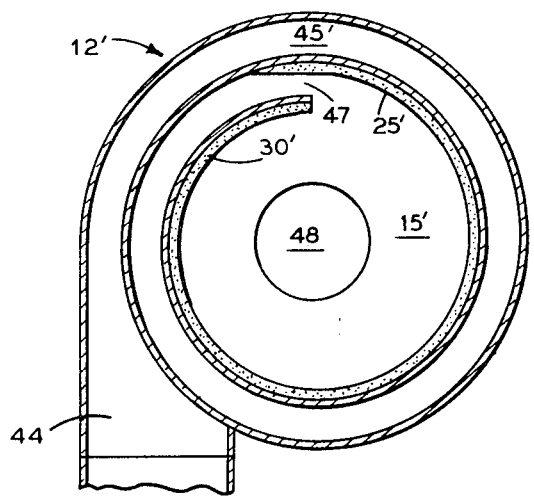
FIG. 3 is a transverse cross-sectional view of the cyclone furnace of FIG. 2 taken along line 3—3.

It will be observed that the furnace 15 shown on FIG. 1 is arranged for water cooling. A modified form of the furnace, designated 15' is shown in FIGS. 2 and 3 where air is used to cool the walls of the furnace. In this version of the furnace the air is caused to flow 1½ times around a circumference of the furnace 15' before it is introduced through the tangential inlet indicated at 47. Since the temperature of the furnace will not be excessive when burning sulfur, air cooling is adequate to protect the furnace walls and, of course, such an arrangement is somewhat cheaper in initial cost than when using a water cooling jacket as shown in the FIG. 1 version of the furnace. Moreover, it will be noted that instead of a reentrant throat type of discharge from the furnace an orifice provides the discharge outlet 48. It will also be noted that instead of the frusto-conical inlet end wall construction of the FIG. 1 version the FIG. 2 furnace is provided with an essentially flat end wall. However, the refractory lining to the furnace is provided with a flared inlet for the introduction of the sulfur into the body of the furnace 15'.

From FIGS. 1, 2 and 3 it is seen that the secondary air inlet opening at 16, 47 in the combustion chambers 15, 15' respectively can extend along the full length thereof, as in the case of FIG. 1 or can extend for somewhat less than the full combustion chamber length, as in the case of FIGS. 2 and 3. In either case, the secondary air inlet opening 16, 47 extends over the major portion of the combustion chamber length, and preferably extends for a length between 0.6 and 1.0 times the combustion chamber length.

By proportioning and constructing the cyclone furnaces 12, 12' with the foregoing combustion chamber and secondary air inlet dimensions it is possible, as indicated by tests, to achieve controlled, stable combustion of sulfur at a burning rate in pounds per hour up to 600 times the square of the combustion chamber diameter as measured in feet, and yet hold the sulfur trioxide content of the combustion gases down to less than 1 percent, even when using as much as 15 percent excess air to further assure complete burning of all sulfur introduced.

What is claimed is:

1. An apparatus for producing sulfur dioxide gas which comprises a furnace having a horizontally disposed combustion chamber of generally circular cross-section with a length-to-diameter ratio ranging from 1.0 to 2.0, a combustion air inlet tangentially positioned with respect to and extending substantially throughout the length of said combustion chamber, an inlet in one end portion of said chamber for introduction of sulfur in fluidized form into said chamber for combustion while moving along a cyclonic path to form sulfur dioxide gas, means including a throat section disposed to define a restricted outlet at the opposite end of said chamber to accommodate the exit therefrom of the sulfur dioxide gas and to increase the residence time of the burning sulfur and air mixture within said chamber to assure substantially complete combustion of all sulfur entering the chamber, said restricted outlet having a diameter within the range of 0.4 to 0.6 times the combustion chamber diameter, a spray tower means having an inlet communicating with the restricted outlet of said furnace combustion chamber to receive therefrom the gaseous combustion products resulting from the burning of said sulfur and including the unburnt gaseous components of said air, said spray tower means including a gas contact chamber for guiding the flow of said gases to a delivery outlet, and including liquid spray means positioned to spray droplets of liquid into said gas contact chamber for contact with the combustion product gases flowing therethrough to cool same and to remove, by absorption in such liquid droplets, sulfur trioxide contained in admixture with said gases, whereby the cooled sulfur dioxide and unburnt air components gas mixture arriving at said delivery outlet is substantially free of sulfur trioxide, jacket means to enclose the walls of said furnace, means for passing a cooling liquid through the jacket, and means for passing said cooling liquid from the jacket to said liquid spray means in the spray tower.

References Cited

UNITED STATES PATENTS

| | | | |
|---|---|---|---|
| 1,473,879 | 11/1923 | Redolf et al. | 23—278 X |
| 1,708,094 | 4/1929 | Howard | 23—278 |
| 1,991,916 | 2/1935 | Zinn | 23—278 X |
| 2,010,376 | 8/1935 | Pyzel | 23—262 UX |
| 2,091,943 | 8/1937 | Gilchrist et al. | 23—262 X |
| 2,619,411 | 11/1952 | Wilcoxson | 23—262 |
| 2,689,780 | 9/1954 | Rice | 23—262 X |
| 2,739,878 | 3/1956 | Jolley | 23—277 R |
| 2,822,245 | 2/1958 | Shipman et al. | 23—278 X |
| 3,314,766 | 4/1967 | Mukherji | 23—278 |
| 3,519,397 | 7/1970 | Bogdanov | 23—278 |

BARRY S. RICHMAN, Primary Examiner

U.S. Cl. X.R.

23—277 R, 278; 423—543